United States Patent
Li

(10) Patent No.: US 8,992,007 B2
(45) Date of Patent: Mar. 31, 2015

(54) EYEGLASSES ENABLING QUICK EXCHANGE OF LENSES

(71) Applicant: Sun Sight Glasses Co., Ltd., Tainan (TW)

(72) Inventor: I-Nan Li, Tainan (TW)

(73) Assignee: Sun Sight Glasses Co., Ltd., Tainan (TW)

( * ) Notice: Subject to any disclaimer, the term of this patent is extended or adjusted under 35 U.S.C. 154(b) by 43 days.

(21) Appl. No.: 13/896,478

(22) Filed: May 17, 2013

(65) Prior Publication Data

US 2014/0340627 A1 Nov. 20, 2014

(51) Int. Cl.
| | | |
|---|---|---|
| G02C 7/06 | (2006.01) | |
| G02C 1/08 | (2006.01) | |
| G02C 7/08 | (2006.01) | |
| G02C 5/04 | (2006.01) | |
| G02C 5/02 | (2006.01) | |

(52) U.S. Cl.
CPC *G02C 7/086* (2013.01); *G02C 5/04* (2013.01); *G02C 5/02* (2013.01)
USPC .............. 351/57; 351/90; 351/124; 351/128; 351/130

(58) Field of Classification Search
CPC .............. G02C 1/04; G02C 1/06; G02C 5/00; G02C 9/02; G02C 2200/08
USPC ................. 351/57, 58, 59, 90, 130, 54, 92
See application file for complete search history.

(56) References Cited

U.S. PATENT DOCUMENTS

| | | | | |
|---|---|---|---|---|
| 3,379,487 | A * | 4/1968 | Amundsen ................ | 351/58 |
| 3,801,189 | A * | 4/1974 | Bolle ....................... | 351/92 |
| 4,176,921 | A * | 12/1979 | Matthias ................. | 351/106 |
| 4,523,819 | A * | 6/1985 | Dianitsch et al. ........ | 351/106 |
| 4,822,158 | A * | 4/1989 | Porsche .................. | 351/57 |
| 4,955,707 | A * | 9/1990 | Gazeley .................. | 351/47 |
| 5,321,444 | A * | 6/1994 | Lin ......................... | 351/86 |
| 5,777,714 | A * | 7/1998 | Conway .................. | 351/47 |
| 5,903,331 | A * | 5/1999 | Lin ......................... | 351/105 |
| 5,971,536 | A * | 10/1999 | Chiu ....................... | 351/41 |
| 6,533,412 | B1 * | 3/2003 | Wang et al. ............. | 351/86 |
| 7,192,134 | B2 * | 3/2007 | Teng ....................... | 351/47 |
| 7,461,935 | B2 * | 12/2008 | Collier et al. ........... | 351/47 |
| 7,537,336 | B2 * | 5/2009 | Zelman ................... | 351/47 |
| 7,614,741 | B1 * | 11/2009 | Chen ....................... | 351/47 |
| 7,854,507 | B1 * | 12/2010 | Chen ....................... | 351/103 |
| 8,192,014 | B1 * | 6/2012 | Brown et al. ............ | 351/59 |
| 8,702,231 | B1 * | 4/2014 | Blackham et al. ....... | 351/47 |
| 2005/0036104 | A1 * | 2/2005 | Howard et al. .......... | 351/131 |

(Continued)

*Primary Examiner* — Suchin Parihar
*Assistant Examiner* — Collin X Beatty
(74) *Attorney, Agent, or Firm* — Rosenberg, Klein & Lee

(57) ABSTRACT

An eyeglasses enabling quick exchange of lenses is provided, in which the lower frame thereof mainly has two lens mounting apertures respectively provided at two sides for mounting lenses. First pivot connectors are provided at middle portion of the lower frame. A fastening member has second pivot connectors which are pivotally connected with the first pivot connectors. A snap-fit hook is provided on the upper end of the fastening member. An upper frame is to be fitted on the upper edge of the lower frame by fastening its two assembly portions provided at both sides of the upper frame to both sides of the lower frame. The upper frame has a snap-fit recess corresponding to the snap-fit hook provided at the middle portion thereof By turning the snap-fit hook upward or downward, the exchange of lenses can be easily conducted without using any tool for disassembly.

1 Claim, 4 Drawing Sheets

(56) References Cited

U.S. PATENT DOCUMENTS

| | | | |
|---|---|---|---|
| 2005/0151925 A1* | 7/2005 | Chen ................................ 351/90 |
| 2006/0098159 A1* | 5/2006 | Canavan et al. ................. 351/57 |
| 2006/0132705 A1* | 6/2006 | Li ..................................... 351/90 |
| 2009/0079930 A1* | 3/2009 | Lipawsky ........................ 351/57 |
| 2009/0219479 A1* | 9/2009 | Tsai ................................. 351/57 |
| 2011/0025974 A1* | 2/2011 | Schepke ....................... 351/105 |
| 2011/0051074 A1* | 3/2011 | Arnell ............................. 351/47 |
| 2011/0075094 A1* | 3/2011 | Ifergan ........................... 351/57 |
| 2011/0279771 A1* | 11/2011 | Chen ............................. 351/140 |
| 2011/0299026 A1* | 12/2011 | Calilung et al. ................ 351/90 |
| 2012/0140162 A1* | 6/2012 | Chen ............................... 351/57 |
| 2012/0218507 A1* | 8/2012 | Calilung et al. .............. 351/153 |
| 2013/0194538 A1* | 8/2013 | Junkins ........................... 351/47 |
| 2014/0063438 A1* | 3/2014 | Cater et al. ..................... 351/62 |
| 2014/0333889 A1* | 11/2014 | Huang ........................... 351/140 |

* cited by examiner

EYEGLASSES ENABLING QUICK EXCHANGE OF LENSES

BACKGROUND OF THE INVENTION

1. Field of the Invention

The present invention relates to an eyeglasses enabling quick exchange of lenses, particularly to a novel eyeglasses enabling quick exchange of lenses, in which the exchange of lenses can be conducted easily and quickly without using any tool for disassembly so as to increase its overall implementation effect and performance.

2. Brief Description of Prior Arts

Generally, eyeglasses according to its intended use can be divided into myopia lenses for nearsighted eyes, presbyopia lenses for presbyopia, sunglasses for sun shading, and goggle for eyes protection in working. Each type of the above eyeglasses has lenses mounted within a frame and temples pivotally located at both sides of the frame as its basic structure, whatever the application type would be.

For common eyeglasses, the combination of its frame and lenses are substantially conducted as below. Two lens mounting apertures are provided on the frame of eyeglasses for lens mounting. The outer side of each mounting aperture has a threading end with tap hole for fixing by a screw. After the lenses are processed to match with the lens mounting apertures, the lenses are inserted into the mounting apertures and screws are threaded at the threading ends for fixing, so that the lenses can be held firmly within the lens mounting apertures without falling off. In this way, the eyeglasses are accomplished and ready for wearing by users.

The above eyeglasses can achieve expected effect of allowing the lenses to be held in the frame, however, as screws have to be used for fixing the lenses in positions when the lenses are to be mounted into the lens mounting apertures of the frame without falling off, a corresponding screwdriver is needed for threading the screws. If a corresponding screwdriver is unavailable on hand, assembly and disassembly operation cannot be conducted and thus the exchange of lenses is impossible. Thus, there are still rooms for improvement on its overall structure.

In view of the above defects, the inventor of the present invention hereby proposes an eyeglasses enabling quick exchange of lenses according to the research and improvement conducted on the conventional product and based on his abundant experiences in both R&D and manufacturing of associated industries, so as to achieve the purpose of better implementation value.

SUMMARY OF THE INVENTION

The main object of this invention is to provide an eyeglasses enabling quick exchange of lenses, in which the exchange of lenses can be easily and quickly conducted by turning the snap-fit hook directly without using any tool for disassembly, when the lenses are to be exchanged. Thus, application convenience can be further enhanced in its overall implementation.

The above object and effect can be achieved by the following specific technical means.

The eyeglasses enabling quick exchange of lenses of the present invention comprises a lower frame, a fastening member, an upper frame and two lenses.

The lower frame mainly has two lens mounting apertures respectively provided at two sides for mounting lenses, and the lower frame has first pivot connectors provided at the middle portion thereof.

The fastening member has second pivot connectors corresponding to the first pivot connectors, and a snap-fit hook is provided on the upper end of the fastening member.

The upper frame is to be fitted on the upper edge of the lower frame by fastening two assembly portions provided at both sides of the upper frame to both sides of the lower frame, and the upper frame has a snap-fit recess, corresponding to the snap-fit hook, provided at the middle portion thereof.

The lenses are to be inserted in the two lens mounting apertures of the lower frame.

According to a preferred embodiment of the eyeglasses enabling quick exchange of lenses of the present invention, the lower frame has a first snap-fit portion which corresponds to the first pivot connectors provided at its upper edge, and the upper frame a second snap-fit portion provided at its middle position which corresponds to the first snap-fit portion of the upper frame, and the upper frame is fitted with the first snap-fit portion of the upper frame in such a manner as to allow the upper frame to be fixed on the lower frame without any displacement happened.

BRIEF DESCRIPTION OF ACCOMPANYING DRAWINGS

The present invention will be better understood by the detailed description of a preferred embodiment with reference to the accompanied drawings, in which.

DETAILED DESCRIPTION OF PREFERRED EMBODIMENTS

The technical contents, objects and effect of the present invention will become more apparent by the detailed description in conjunction with the accompanied drawings.

Figure 1:
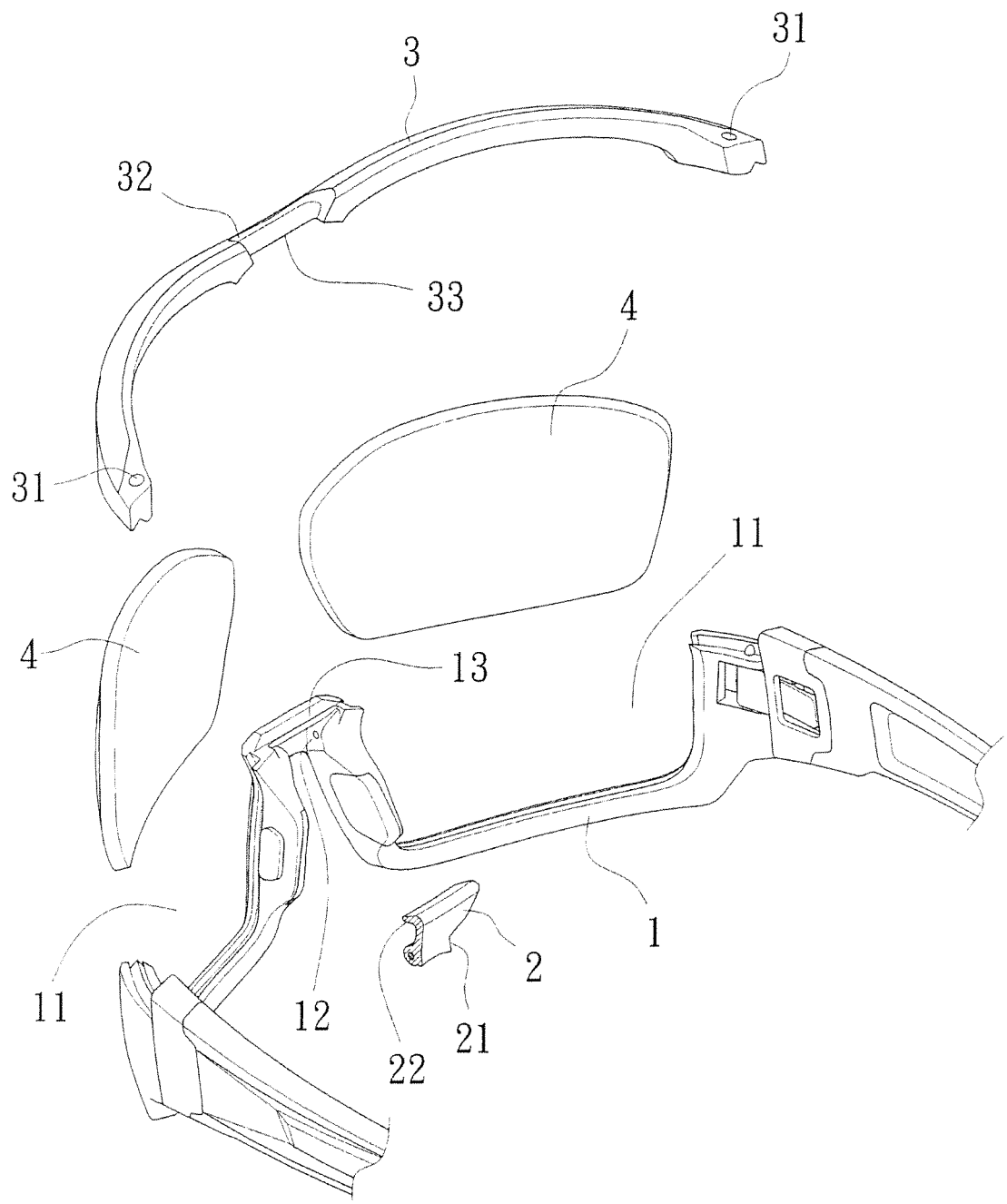
FIG. 1 is a perspective schematic exploded view of the present invention.

FIG. 1 is a perspective exploded schematic exploded view of the present invention. As shown in the figure, the present invention mainly comprises a lower frame (1), a fastening member (2), an upper frame (3) and two lenses (4).

The lower frame (1) has two lens mounting apertures (11) respectively provided at two sides for mounting lenses, and two first pivot connectors (12) are provided at the middle position thereof A first snap-fit portion (13) corresponding to the first pivot connectors (12) is provided on the upper edge of the lower frame (1).

The fastening member (2) has second pivot connectors (21) corresponding to the first pivot connectors (12) and a snap-fit hook (22) is provided on the upper end of the fastening member (2).

The upper frame (3) is to be fitted on the upper edge of the lower frame (1) by fastening two assembly portions (31) provided at both sides of the upper frame (3) to both sides of the lower frame (1), and the upper frame (3) has a snap-fit recess (32) corresponding to the snap-fit hook (22) of the fastening member (2), provided at the middle portion thereof. The upper frame (3) also has a second snap-fit portion (33) provided at its middle position that corresponds to the first snap-fit portion (13) of the lower frame (1).

The lenses (4) are to be inserted in the two lens mounting apertures (11) of the lower frame (1).

Figure 2:
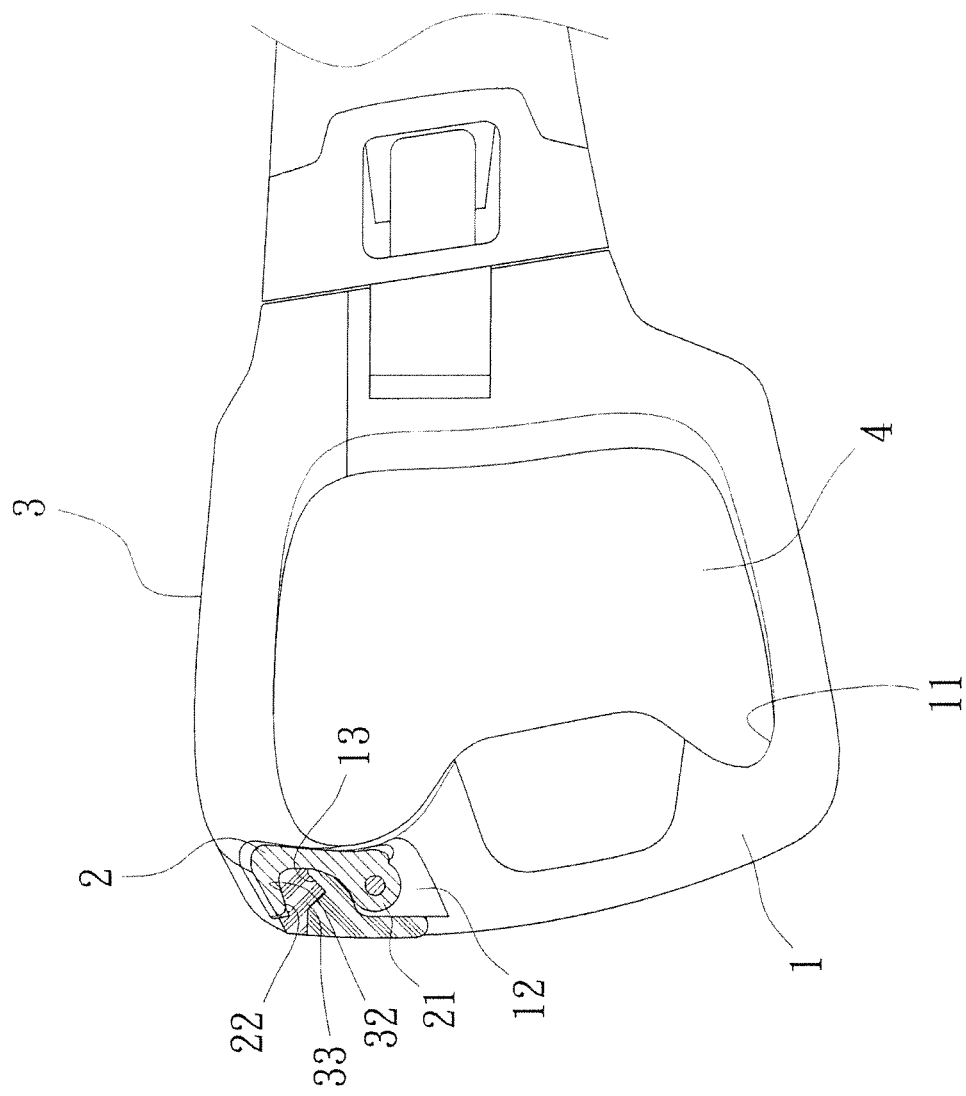
FIG. 2 is a schematic sectional view showing the assembly of the present invention.
Figure 3:
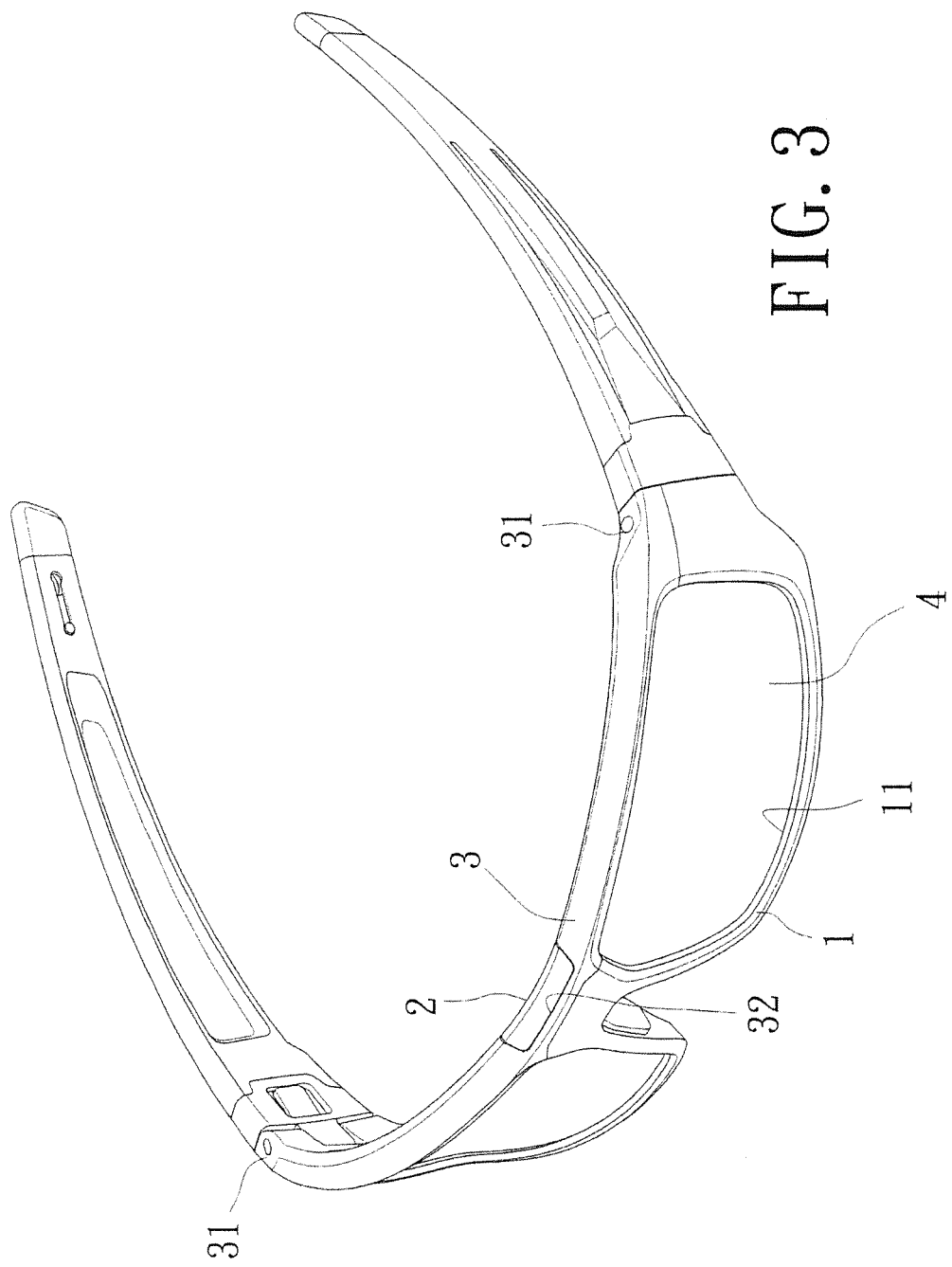
FIG. 3 is a perspective schematic view showing the assembly structure of the present invention.

FIG. 2 is a schematic sectional view showing the assembly process of the present invention, and FIG. 3 is a perspective schematic view showing the assembly structure of the present invention. In the assembling process as shown in these figures, the fastening member (2) is assembled to the lower frame (1) by mutual fitting between the first pivot connectors (12) and the second pivot connectors (21). Then, the upper frame (3) is fastened to the upper edge of the lower frame (1) by fastening the assembly portions (31) of the upper frame (3) on the two sides of the lower frame (1). Next, the lenses (4) are inserted into the lens mounting apertures (11) of both sides of the lower frame (1), and the second snap-fit portion (33) of the upper frame (3) is fastened with the first snap-fit portion (13) of the lower frame (1) so as to allow the upper frame (3) fixed in place. In turn, the fastening member (2) is turned upward with the second pivot connectors (21) mating with the first pivot connectors (12) as the center, until the snap-fit hook (22) of the fastening member (2) is completely engaged with the snap-fit recess (32) of the is upper frame (3). In this manner, the lenses (4) can be firmly fixed within the lens mounting apertures (11) of the lower frame (1) without falling off.

Figure 4:
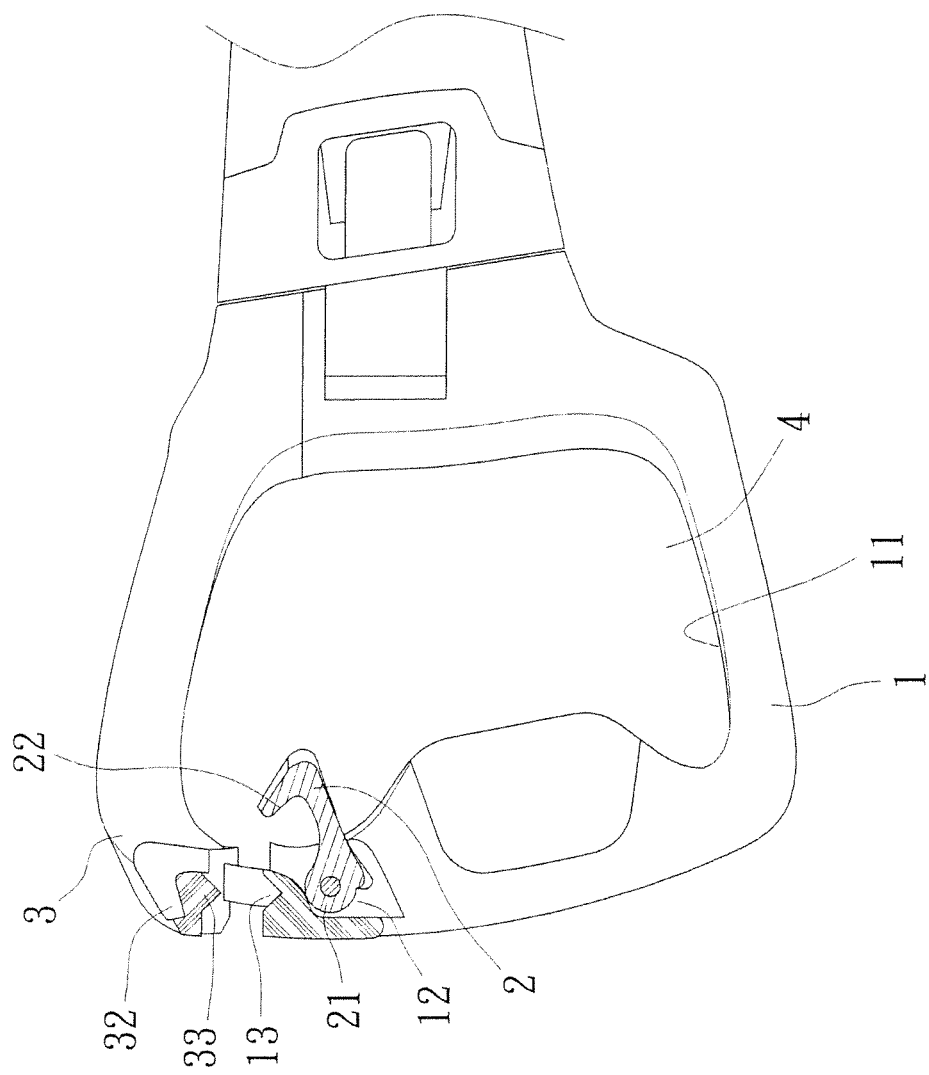
FIG. 4 is a schematic sectional view showing the state of usage of the present invention.

When the lenses (4) is to be exchanged, referring to FIG. 4, the fastening member (2) is turned downward with the second pivot connectors (21) mating with the first pivot connectors (12) as the center, until the snap-fit hook (22) of the fastening member (2) is completely detached from the snap-fit recess (32) of the upper frame (3). Then, the upper frame (3) can be slightly turned upward so as to pick the lenses (4) out of the lens mounting apertures (11) of the lower frame (1) and to insert new lenses (4) in place. Thus, the overall exchange operation is very convenient.

Based on foregoing description of constitution and implementation of the present invention, by turning the fastening member directly, the exchange of lenses can be easily conducted without using any tool for assembly and disassembly. Therefore, more practical convenience can be achieved in its overall implementation.

What is claimed is:

1. An eyeglasses enabling quick exchange of lenses, comprising a lower frame, a fastening member, an upper frame and two lenses, wherein:
    said lower frame mainly has two lens mounting apertures respectively provided at two sides for mounting lenses, and said lower frame has first pivot connectors provided at the middle portion thereof;
    said fastening member has second pivot connectors corresponding to said first pivot connectors, and said fastening member also has a snap-fit hook provided on the upper end thereof;
    said upper frame is to be fitted on the upper edge of said lower frame by fastening its two assembly portions provided at both sides of said upper frame to both sides of the lower frame, and said upper frame has a snap-fit recess, corresponding to said snap-fit hook of said fastening member, provided at the middle portion thereof;
    said lenses are to be inserted in said two lens mounting apertures of said lower frame;
    wherein said lower frame has a first snap-fit portion corresponding to the first pivot connectors and provided at its upper edge, and said upper frame has a second snap-fit portion provided at its middle position and corresponding to said first snap-fit portion of said upper frame, and said second snap-fit portion of said upper frame is fitted with said first snap-fit portion of the lower frame in such a manner as to allow said upper frame to be fixed on said lower frame without any displacement.

\* \* \* \* \*